US012444856B2

(12) United States Patent
Lee et al.

(10) Patent No.: US 12,444,856 B2
(45) Date of Patent: Oct. 14, 2025

(54) MICROSTRIP ANTENNA AND RADAR DEVICE FOR VEHICLE INCLUDING THE SAME

(71) Applicant: HL Klemove Corp., Incheon (KR)

(72) Inventors: Hyunseok Lee, Yongin-si (KR); Sungjoon Heo, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 259 days.

(21) Appl. No.: 18/127,057

(22) Filed: Mar. 28, 2023

(65) Prior Publication Data

US 2023/0307845 A1 Sep. 28, 2023

(30) Foreign Application Priority Data

Mar. 28, 2022 (KR) ........................ 10-2022-0038085

(51) Int. Cl.
*H01Q 19/00* (2006.01)
*H01Q 13/08* (2006.01)

(52) U.S. Cl.
CPC ........... *H01Q 19/005* (2013.01); *H01Q 13/08* (2013.01)

(58) Field of Classification Search
CPC ....... G01S 13/931; G01S 7/03; H01Q 1/3233; H01Q 13/08; H01Q 13/206; H01Q 19/005; H01Q 21/08
See application file for complete search history.

(56) References Cited

U.S. PATENT DOCUMENTS

| | | | | |
|---|---|---|---|---|
| 5,406,292 | A * | 4/1995 | Schnetzer | H01Q 13/106 343/872 |
| 5,621,422 | A * | 4/1997 | Wang | H01Q 9/27 343/895 |
| 2005/0113133 | A1* | 5/2005 | Li | H01Q 9/0442 455/552.1 |
| 2011/0260925 | A1* | 10/2011 | Chirila | H01Q 1/38 343/700 MS |
| 2017/0047656 | A1* | 2/2017 | Bocskor | H01Q 9/0407 |
| 2018/0331420 | A1* | 11/2018 | Brobston | H01Q 3/24 |
| 2019/0140364 | A1* | 5/2019 | Mirmozafari | H01Q 1/246 |
| 2021/0151874 | A1* | 5/2021 | Sudo | H01Q 21/065 |

(Continued)

FOREIGN PATENT DOCUMENTS

| | | |
|---|---|---|
| KR | 10-2011-0114373 A | 10/2011 |
| KR | 10-2015-0085581 A | 7/2015 |

(Continued)

OTHER PUBLICATIONS

Office Action dated Jul. 23, 2024 for corresponding Korean Patent Application No. 10-2022-0038085, along with an English translation (9 pages).

(Continued)

*Primary Examiner* — Thien M Le
(74) *Attorney, Agent, or Firm* — Hauptman Ham, LLP

(57) ABSTRACT

The present invention provides a microstrip patch antenna comprising: a power supply element supplied with current from a current source, a power supply line connected to the power supply element, a plurality of radiating elements connected to one side or both sides of the power supply line and arranged in the longitudinal direction of the power supply line, and a parasitic patch spaced apart from the radiating element and disposed around the radiating element.

12 Claims, 10 Drawing Sheets

(56) References Cited

U.S. PATENT DOCUMENTS

| | | | | |
|---|---|---|---|---|
| 2023/0258768 A1* | 8/2023 | Amadjikpe | ............. | G01S 13/87 342/174 |
| 2023/0291107 A1* | 9/2023 | Hara | .................... | H01Q 9/0407 |

FOREIGN PATENT DOCUMENTS

| | | | |
|---|---|---|---|
| KR | 10-2015-0086147 | A | 7/2015 |
| KR | 10-2015-0137554 | A | 12/2015 |
| KR | 10-2020-0110069 | A | 9/2020 |

OTHER PUBLICATIONS

Korean Office Action dated Nov. 19, 2023 for corresponding Korean Patent Application No. 10-2022-0038085, along with an English machine translation (8 pages).

* cited by examiner

MICROSTRIP ANTENNA AND RADAR DEVICE FOR VEHICLE INCLUDING THE SAME

CROSS-REFERENCE TO RELATED APPLICATION

This application claims priority to and the benefit of Korean Patent Application No. 10-2022-0038085, filed on Mar. 28, 2022, the disclosure of which is incorporated herein by reference in its entirety.

BACKGROUND

1. Field of the Invention

The present invention relates to a microstrip antenna and a vehicle radar device including the same.

2. Discussion of Related Art

A vehicle radar device is mounted on a vehicle and used in a technology for assisting vehicle operation. Recently, as research on autonomous driving technology progresses, technology for improving the accuracy of recognition of the environment around the vehicle is being developed.

The vehicle radar devices are mounted at various positions of the vehicle in order to precisely detect objects existing in the environment around the vehicle. For example, the vehicle radar devices are mounted at positions such as the front, rear, or corner (front right, front left, rear right, rear left) of the vehicle to obtain information on the objects or the like present in the environment around the vehicle.

Among them, a corner radar mounted on the corner of the vehicle is used for a blind spot detection (BSD) function that gives a warning through detection of the objects existing in a blind spot.

As functions required for fully autonomous driving technology are gradually diversified, the performance required for the corner radar is gradually increasing.

In particular, in order to secure stable performance in implementing a lane change function of a vehicle, accurate detection of the objects present around the vehicle and in the driving direction is required.

A microstrip antenna applied to the vehicle radar device is widely used because it has a flat structure, is easy to manufacture, and is inexpensive. However, in general, the microstrip antennas have problems due to narrow bandwidth and beam width.

SUMMARY OF THE INVENTION

An object of the present invention is to provide a microstrip antenna capable of widening the bandwidth and beam width thereof, and a vehicle radar device including the same.

The technical objects to be achieved in the present invention are not limited to the technical object mentioned above, and other technical objects not mentioned will be clearly understood by those skilled in the art from the following description.

In order to achieve the above object, the present invention provides a microstrip patch antenna comprising: a power supply element supplied with current from a current source, a power supply line connected to the power supply element, a plurality of radiating elements connected to one side or both sides of the power supply line and arranged in the longitudinal direction of the power supply line, and a parasitic patch spaced apart from the radiating element and disposed around the radiating element.

Here, at least one via hole may be formed in the parasitic patch.

In addition, the parasitic patch may be provided on one side or both sides of the radiating element.

Further, the parasitic patch may be positioned to protrude more outward than the radiating element.

In addition, the beam width may be adjusted according to the number, location, length, and width of the parasitic patch.

In addition, the beam width may be adjusted according to the number, location, length, and width of the via hole.

In addition, the radiating element may be formed such that the size thereof increases from both ends of the power supply line to the center.

Further, the power supply element may have a greater width than the power supply line.

In addition, the radiating elements may include: a plurality of first radiating elements arranged at predetermined intervals on one side of the power supply line; and a plurality of second radiating elements arranged at predetermined intervals on the other side of the power supply line and disposed between the plurality of first radiating elements. In addition, the present invention provides a vehicle radar device including: a microstrip patch antenna comprising a power supply element supplied with current from a current source, a power supply line connected to the power supply element, a plurality of radiating elements connected to one side or both sides of the power supply line and arranged in the longitudinal direction of the power supply line, and a parasitic patch spaced apart from the radiating element and disposed around the radiating element; and a control unit that transmits a signal to the power supply line, receives a reflected signal when the signal is reflected by an object around the vehicle, and detects the surrounding object using the signal and the reflected signal.

Here, at least one via hole may be formed in the parasitic patch.

In addition, the parasitic patch may be provided on one side or both sides of the radiating element.

Further, the parasitic patch may be positioned to protrude more outward than the radiating element.

In addition, the radiating element may be formed such that the size thereof increases from both ends of the power supply line to the center.

Further, the power supply element may have a greater width than the power supply line.

In addition, the radiating elements may include: a plurality of first radiating elements arranged at predetermined intervals on one side of the power supply line; and a plurality of second radiating elements arranged at predetermined intervals on the other side of the power supply line and disposed between the plurality of first radiating elements.

According to the present invention, there is an effect of widening the bandwidth and beam width of the microstrip antenna by using the parasitic patch and the via hole.

In addition, according to the present invention, the bandwidth and beam width of the microstrip antenna can be effectively widened by forming the position and size of the parasitic patch and the via hole within a critical range.

The effects of the present invention are not limited to the above-mentioned effects, and other effects not mentioned will be clearly understood by those skilled in the art from the following description.

DETAILED DESCRIPTION OF THE EMBODIMENTS

Figure 1:
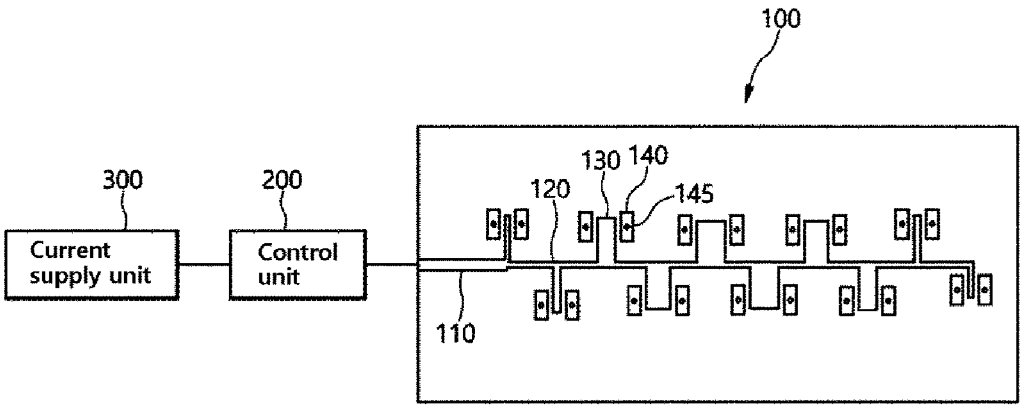
FIG. 1 is a diagram illustrating a vehicle radar device according to an embodiment of the present invention.

Hereinafter, with reference to the accompanying drawings, embodiments of the present invention will be described in detail so as to be easily implemented by one of ordinary skill in the art to which the present invention pertains. The present invention may be embodied in a variety of forms and is not be limited to the embodiments described herein. In order to clearly describe the present invention in the drawing, parts irrelevant to the description are omitted from the drawings; and throughout the specification, same or similar components are referred to as like reference numerals.

In the specification, terms such as “comprise” or “have” are intended to designate that a feature, number, step, operation, component, part or combination thereof described in the specification is present, but should not be construed to preclude the possibility of the presence or addition of one or more other features, numbers, steps, operations, components, parts or combinations thereof.

FIG. 1 is a diagram illustrating a vehicle radar device according to an embodiment of the present invention.

As shown in FIG. 1, a vehicle radar device according to an embodiment of the present invention may be configured to include a microstrip patch antenna 100, a control unit 200, and a current supply unit 300.

Here, the microstrip patch antenna 100 may be configured to include a power supply element 110, a power supply line 120, a radiating element 130, and a parasitic patch 140.

The microstrip patch antenna 100 is applied to a radar system installed in a vehicle and is provided on a dielectric substrate to transmit and receive horizontally polarized waves.

The power supply element 110 may supply current to the radiating element 130 while being electrically connected to the current source 300 provided in the vehicle. In addition, the power supply element 110 may be electrically connected to the controller 200 for signal transmission and reception.

The power supply line 120 is formed to extend to a certain length, wherein the power supply element 110 is connected to one end of the power supply line 120 in the longitudinal direction to supply current. Here, the power supply line 120 may have a straight shape, but is not limited thereto.

In addition, the power supply element 110 may be formed to have a greater width than the power supply line 120. That is, since the power supply element 110 is a point at which current supply starts, resistance may be minimized by making the width thereof wide.

The radiating element 130 may be connected to one side or both sides of the power supply line 120 and be arranged in the longitudinal direction of the power supply line 120. In addition, the radiating element 130 may extend in the width direction of the power supply line 120. That is, the radiating element 130 may be provided in plurality and branched in the form of a branch from the power supply line 120.

The radiating element 130 may be provided in a plurality at predetermined intervals on the power supply line 120 to transmit and receive horizontally polarized waves.

Specifically, the radiating elements 130 may include: a plurality of first radiating elements arranged at predetermined intervals on one side of the power supply line 120, and a plurality of second radiating elements arranged at predetermined intervals on the other side of the power supply line 120 and disposed between the first radiating elements. That is, since the first radiating element and the second radiating element are arranged in a zigzag pattern, the bandwidth and beam width of the antenna can be expanded compared to the case where they are arranged at the same position.

The radiating element 130 may be formed in a rectangular shape, but is not limited thereto and may be formed in various shapes.

The radiating element 130 may be formed such that the size thereof increases from both ends of the power supply line to the center. However, the lengths of the radiating elements 130 extending from both sides of the power supply line 120 may be formed to be the same. This is to expand the bandwidth and beam width of the antenna by lowering the energy of the side lobe and concentrating the energy in the center.

The power supply element 110, the power supply line 120 and the radiating element 130 may be integrally formed. Here, the microstrip patch antenna 100 may be made of a conductive metal, and representative conductive metals include silver (Ag) or copper (Cu).

The microstrip patch antenna 100 may be formed by patterning a metal thin film formed on a dielectric substrate by a method such as etching, or may be formed on a dielectric substrate by a printing method or the like, but is not limited thereto.

The parasitic patch 140 may be spaced apart from the radiating element 130 and disposed around the radiating element 130. Here, the parasitic patch 140 may be formed in a rectangular shape, but is not limited thereto and may be formed in various shapes.

The parasitic patch 140 may be provided on one side or both sides of the radiating element 130, respectively. For example, the parasitic patch 140 may be provided on both ends of the radiating element 130.

Further, the parasitic patch 140 may be positioned to protrude more outward than the end of the radiating element 130.

The parasitic patch 140 serves to widen the bandwidth and beam width of the microstrip antenna 100. That is, the parasitic patch 140 can expand the bandwidth and beam width of the antenna by absorbing horizontally polarized waves radiated from the edge of the radiating element 130.

In the microstrip antenna 100 according to an embodiment of the present invention, the bandwidth and beam width of the antenna may be adjusted according to the number, location, length, and width of the parasitic patch 140.

In addition, at least one via hole 145 may be formed in the parasitic patch 140.

In the microstrip antenna 100 according to an embodiment of the present invention, the bandwidth and beam width of the antenna may be adjusted according to the number, location, length, and width of the via hole 145.

Such a via hole 145 serves to further widen the bandwidth and beam width of the microstrip antenna 100 compared to the one having only the parasitic patch 140. That is, when the parasitic patch 140 absorbs the horizontally polarized wave radiated from the edge of the radiating element 130, the energy generated by the horizontally polarized wave flows to the ground of the dielectric substrate through the via hole 145, whereby the bandwidth and beam width of the antenna can be further expanded.

Figure 2:
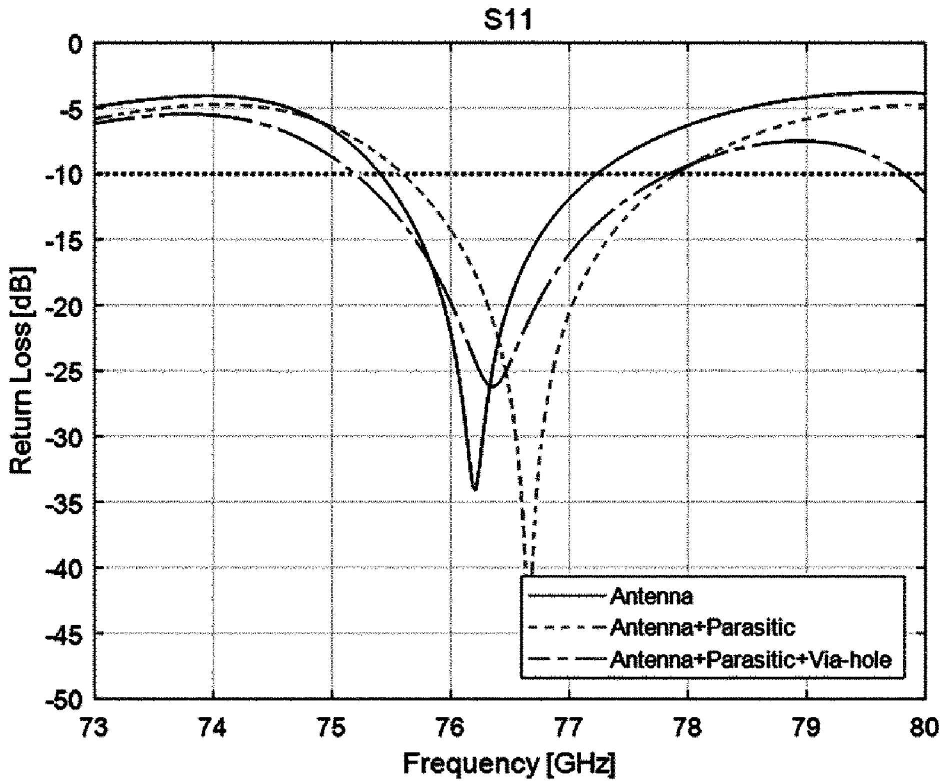
FIG. 2 is a graph simulating the return loss of microstrip antennas of the prior art and the present invention.

FIG. 2 is a graph simulating the return loss of microstrip antennas of the prior art and the present invention.

Referring to FIG. 2, in the case of a conventional microstrip antenna (indicated by a solid line) without the parasitic patch 140 and the via hole 145, the center frequency is about 76.2 GHz, and the operating bandwidth for 10 dB return loss is 1.82 GHz in the frequency characteristics based on the reflection coefficient S11 (frequency characteristics for return loss).

In the case of the microstrip antenna 100 (indicated by a dotted line) of the present invention with only the parasitic patch 140, the center frequency is about 76.7 GHz, and the operating bandwidth for 10 dB return loss is 2.29 GHz in the frequency characteristics based on the reflection coefficient S11 (frequency characteristics for return loss).

In the case of the microstrip antenna 100 (indicated by a dashed-dotted line) of the present invention having the parasitic patch 140 and the via hole 145, the center frequency is about 76.4 GHz, and the operating bandwidth for 10 dB return loss is 2.65 GHz in the frequency characteristics based on the reflection coefficient S11 (frequency characteristics for return loss).

As such, it can be seen that the microstrip antenna 100 of the present invention having the parasitic patch 140 and the via hole 145 has the widest operating bandwidth for 10 dB return loss.

Figure 3:
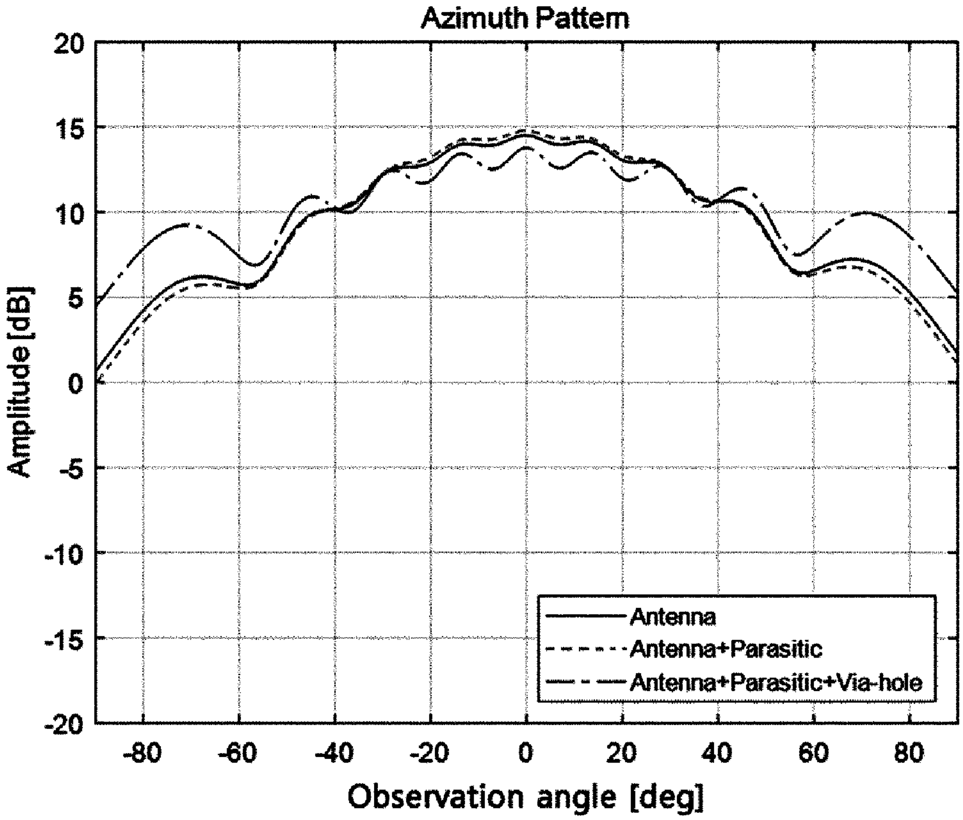
FIG. 3 is a graph simulating radiation patterns of microstrip antennas of the prior art and the present invention.

FIG. 3 is a graph simulating radiation patterns of microstrip antennas of the prior art and the present invention.

Referring to FIG. 3, in the case of a conventional microstrip antenna (indicated by a solid line) without the parasitic patch 140 and the via hole 145, the observation angle for an amplitude of 10 dB is 161.4 degrees.

In the case of the microstrip antenna 100 (indicated by a dotted line) of the present invention with only the parasitic patch 140, the observation angle for an amplitude of 10 dB is 155.1 degrees.

In the case of the microstrip antenna 100 (indicated by a dashed-dotted line) of the present invention having the parasitic patch 140 and the via hole 145, the observation angle for an amplitude of 10 dB is 186.7 degrees.

As such, it can be seen that the microstrip antenna 100 of the present invention having the parasitic patch 140 and the via hole 145 has the widest observation angle for an amplitude of 10 dB.

Figure 4:
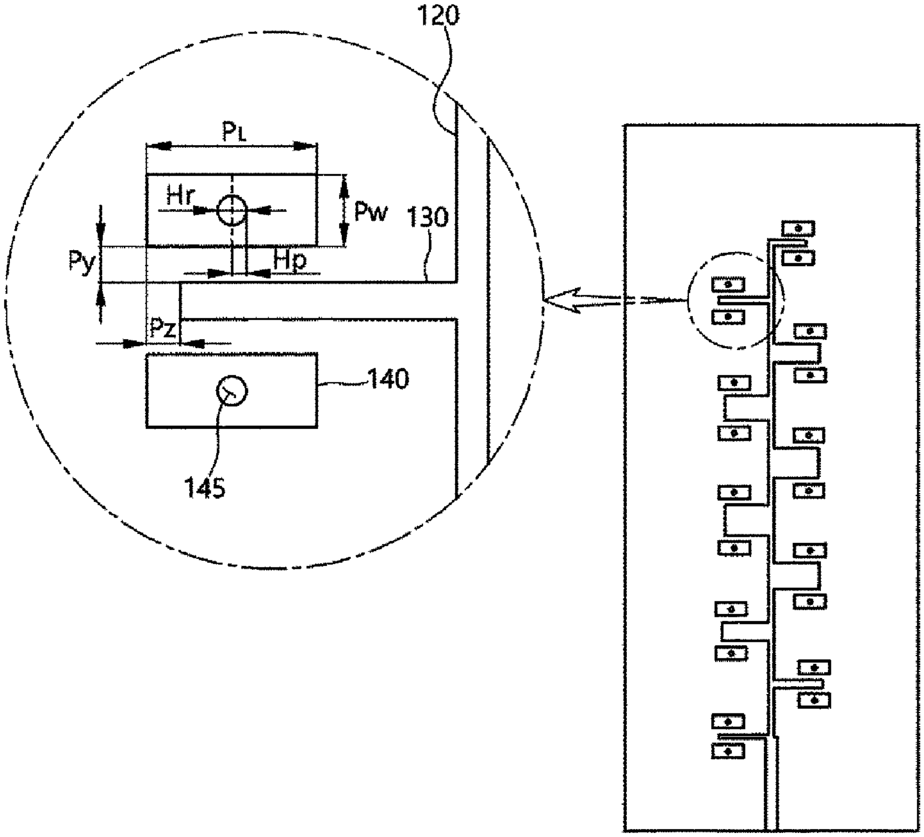
FIG. 4 is a diagram for explaining the location and size of a parasitic patch and a via hole of a microstrip antenna according to an embodiment of the present invention.
Figure 5:
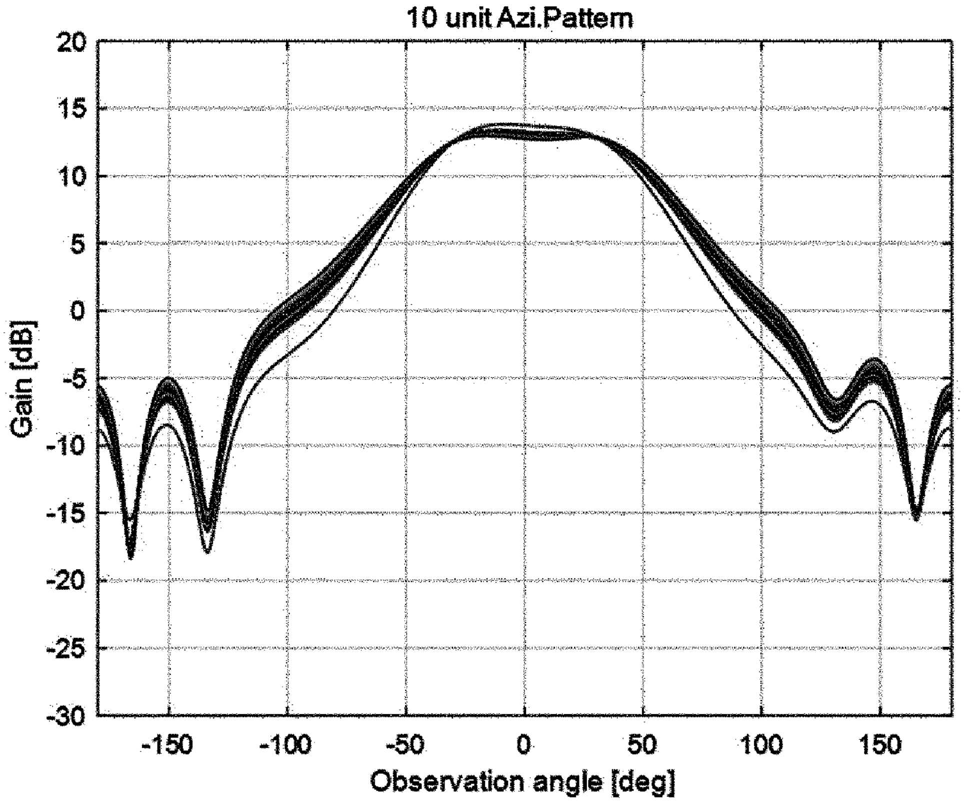
FIG. 5 is a graph simulating an observation angle according to a change in the size of a parasitic patch.
Figure 6:
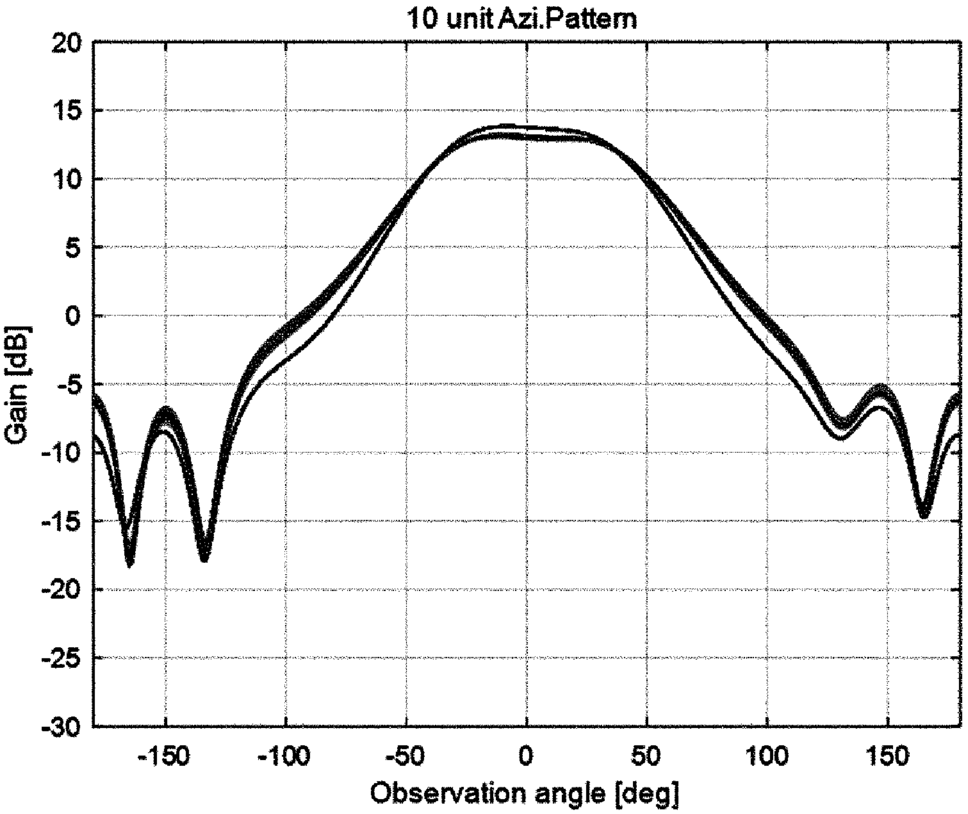
FIG. 6 is a graph simulating an observation angle according to a change in the position of a parasitic patch.
Figure 7:
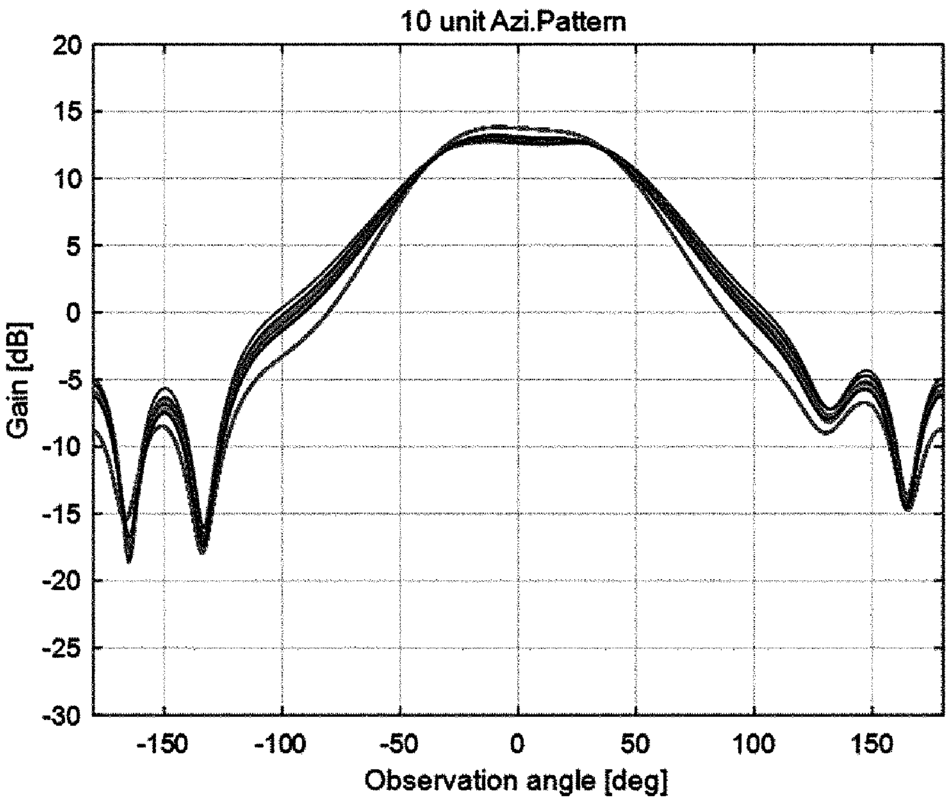
FIG. 7 is a graph simulating an observation angle according to a change in the size of a via hole.
Figure 8:
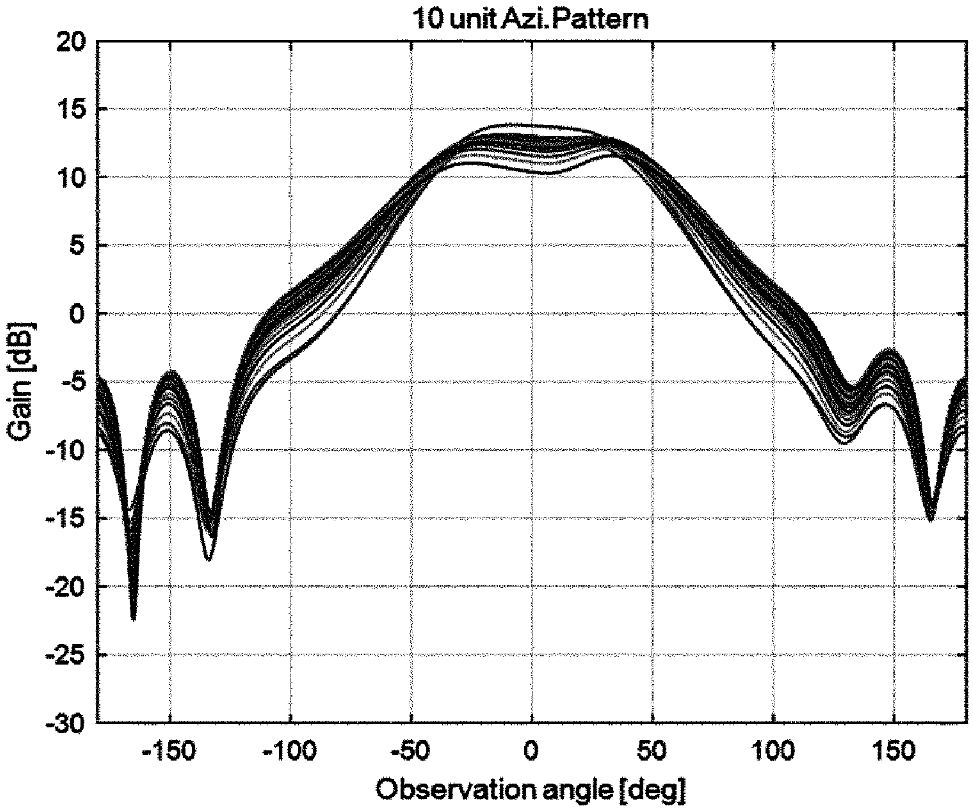
FIG. 8 is a graph simulating an observation angle according to a change in the position of a parasitic patch.

FIG. 4 is a diagram for explaining the location and size of a parasitic patch and a via hole of a microstrip antenna according to an embodiment of the present invention; FIG. 5 is a graph simulating an observation angle according to a change in the size of a parasitic patch; FIG. 6 is a graph simulating an observation angle according to a change in the position of a parasitic patch; FIG. 7 is a graph simulating an observation angle according to a change in the size of a via hole; and FIG. 8 is a graph simulating an observation angle according to a change in the position of a parasitic patch.

Referring to FIGS. 4 and 5, as a result of simulation while changing the horizontal length ($P_L$) and the vertical length ($P_W$) of the parasitic patch 140, it was confirmed that when the horizontal length ($P_L$) of the parasitic patch 140 was in the range of 0.178 to 0.24 lambda (here, 1 lambda: 3.92 mm) and the vertical length ($P_W$) of the parasitic patch 140 is in the range of 0.076 to 0.102 lambda, an observation angle with technically critical significance appeared.

In addition, referring to FIGS. 4 and 6, as a result of simulation while changing the x-axis position ($P_x$) and the y-axis position ($P_y$) of the parasitic patch 140 spaced apart from the end of the radiating element 130, it was confirmed that when the x-axis position ($P_x$) and the y-axis position ($P_y$) of the parasitic patch 140 was in the range of 0.038 to 0.063 lambda (here, 1 lambda: 3.92 mm), an observation angle with technically critical significance appeared.

In addition, referring to FIGS. 4 and 7, as a result of simulation while changing the radius ($H_r$) of the via hole 145, it was confirmed that when the radius ($H_r$) of the via hole 145 is in the range of 0.035 to 0.051 lambda (here, 1 lambda: 3.92 mm), an observation angle having technically critical significance appeared.

In addition, referring to FIGS. 4 and 8, as a result of simulation while changing the top, bottom, left and right positions ($H_p$) of the via hole 145 based on the center of the parasitic patch 145, it was confirmed that when the top, bottom, left and right positions ($H_p$) of the via hole 145 was in the range of −0.02 to 0.02 lambda (here, 1 lambda: 3.92 mm), an observation angle having technically critical significance appeared.

As such, in the microstrip antenna 100 according to an embodiment of the present invention, the position and size of the parasitic patch 140 and the via hole 145 are formed within the critical range as described above, the bandwidth and beam width of the antenna can be effectively widened.

Figure 9:
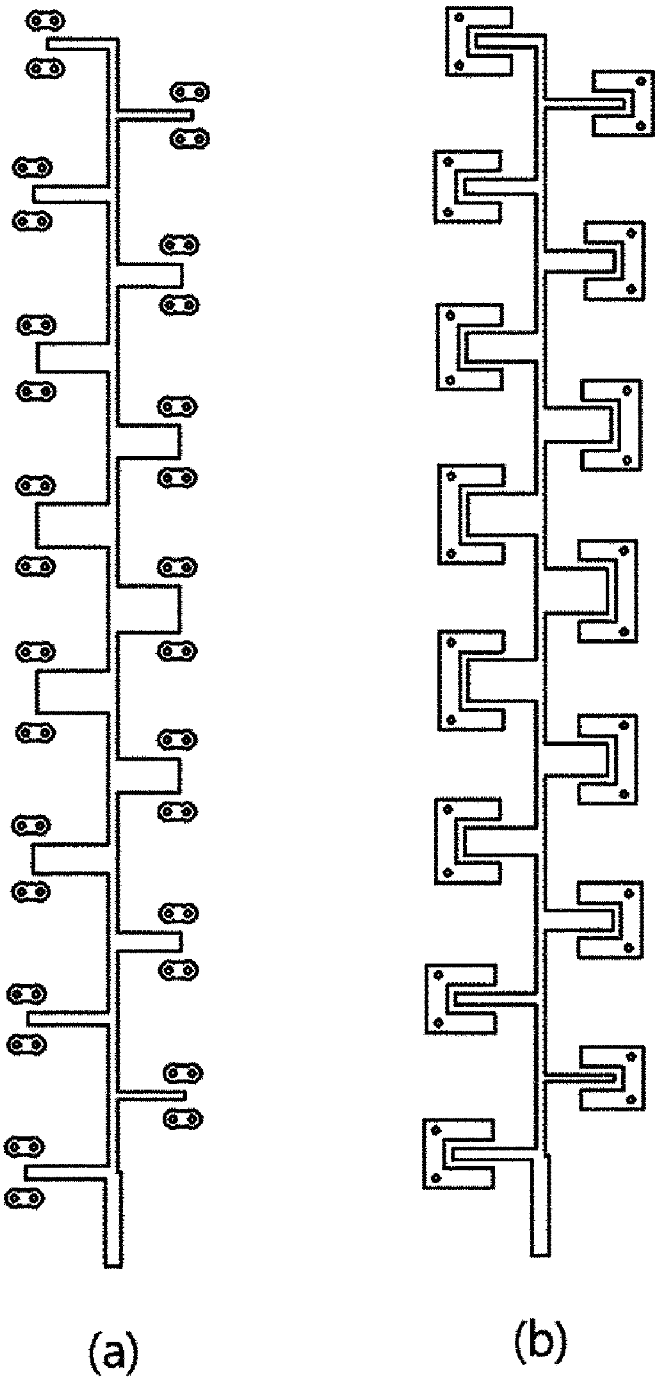
FIGS. 9 and 10 are diagrams illustrating various embodiments of a parasitic patch and a via hole according to the present invention.
Figure 10:
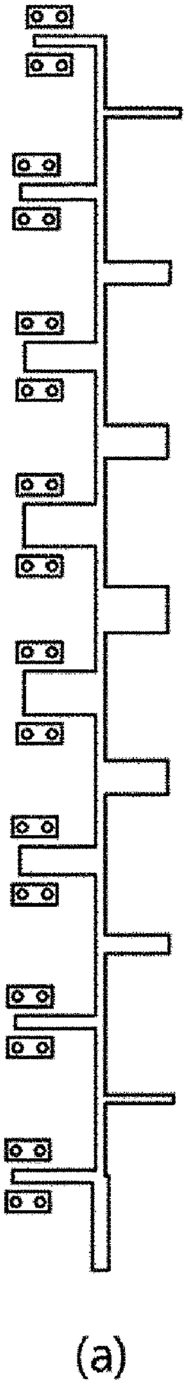

FIGS. 9 and 10 are diagrams illustrating various embodiments of a parasitic patch and a via hole according to the present invention.

Referring to FIG. 9, the parasitic patch 140 may be spaced apart from the radiating element 130 and disposed around the radiating element 130 in a peanut shape (a). In addition, the via hole 145 may be formed on both sides of the parasitic patch 140 based on the center of the radiating element 130. Here, the parasitic patch 140 may be formed for all of the radiating elements 130 provided on both sides of the power supply line 120.

In addition, the parasitic patch 140 may be spaced apart from the radiating element 130 and disposed in a “U” shape (b) surrounding the end of the radiating element 130. In addition, the via hole 145 may be formed on both sides of the parasitic patch 140 most spaced apart from the radiating element 130. Here, the parasitic patch 140 may be formed for all of the radiating elements 130 provided on both sides of the power supply line 120.

Referring to FIG. 10, the parasitic patch 140 may be spaced apart from the radiating element 130 and disposed around the radiating element 130 in a rectangular shape. In addition, the via hole 145 may be formed on both sides of the parasitic patch 140 based on the center of the radiating element 130. In this case, compared to the case where only one via hole 145 is formed, the energy generated by the horizontally polarized wave is more quickly flowed to the ground of the dielectric substrate, whereby the bandwidth and beam width of the antenna can be further expanded.

Here, the parasitic patch 140 may be formed only for the radiating element 130 provided on either side of the power supply line 120.

Figure 11:
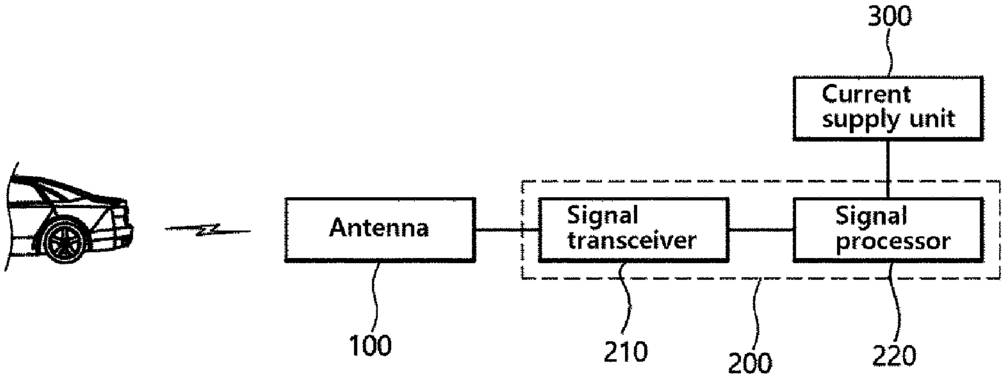
FIG. 11 is a specific block diagram of a control unit of a vehicle radar device according to an embodiment of the present invention.

FIG. 11 is a specific block diagram of a control unit of a vehicle radar device according to an embodiment of the present invention.

Referring to FIG. 11, a vehicle radar device according to an embodiment of the present invention may be configured to include an antenna 100, a controller 200, and a current source 300.

The controller 200 may transmit a signal to the power supply line 120, receive a reflected signal when the signal is reflected by an object around the vehicle, and detect the surrounding object using the signal and the reflected signal.

To this end, the controller 200 includes a signal transceiver 210 that transmits a signal to the power supply line 120 and the radiating element 130 and receives a reflected signal when the signal is reflected by an object around the vehicle; and a processor 220 that processes and analyzes the signal and the reflected signal to detect the surrounding object.

Although an embodiment of the present invention have been described above, the spirit of the present invention is not limited to the embodiment presented in the subject specification; and those skilled in the art who understands the spirit of the present invention will be able to easily suggest other embodiments through addition, changes, elimination, and the like of elements without departing from the scope of the same spirit, and such other embodiments will also fall within the scope of the present invention.

What is claimed is:

1. A microstrip patch antenna comprising:

a power supply element supplied with current from a current source;

a power supply line connected to the power supply element;

a plurality of radiating elements connected to one side or both sides of the power supply line and arranged in the longitudinal direction of the power supply line; and a parasitic patch spaced apart from the radiating element and disposed around the radiating element, wherein at least one via hole is formed in the parasitic patch, and wherein a beam width is adjusted according to a number, location, length, and width of the via hole.

2. The microstrip patch antenna according to claim 1, wherein the parasitic patch is provided on one side or both sides of the radiating element.

3. The microstrip patch antenna according to claim 2, wherein the parasitic patch is positioned to protrude more outward than the radiating element.

4. The microstrip patch antenna according to claim 1, wherein the beam width is adjusted according to the number, location, length, and width of the parasitic patch.

5. The microstrip patch antenna according to claim 1, wherein a size of the radiating element increases from both ends of the power supply line toward the center.

6. The microstrip patch antenna according to claim 1, wherein the power supply element has a greater width than the power supply line.

7. The microstrip patch antenna according to claim 1, wherein the radiating elements include:

a plurality of first radiating elements arranged at predetermined intervals on one side of the power supply line; and a plurality of second radiating elements arranged at predetermined intervals on an other side of the power supply line and disposed between the plurality of first radiating elements.

8. A vehicle radar device including:

a microstrip patch antenna comprising a power supply element supplied with current from a current source, a power supply line connected to the power supply element, a plurality of radiating elements connected to one side or both sides of the power supply line and arranged in a longitudinal direction of the power supply line, and a parasitic patch spaced apart from the radiating element and disposed around the radiating element; and a controller that transmits a signal to the power supply line, receives a reflected signal when the signal is reflected by an object around the vehicle, and detects a surrounding object using the signal and the reflected signal, wherein at least one via hole is formed in the parasitic patch, and wherein a beam width is adjusted according to a number, location, length, and width of the via hole.

9. The vehicle radar device according to claim 8, wherein the parasitic patch is provided on one side or both sides of the radiating element.

10. The vehicle radar device according to claim 9, wherein the parasitic patch is positioned to protrude more outward than the radiating element.

11. The vehicle radar device according to claim 8, wherein the power supply element has a greater width than the power supply line.

12. The vehicle radar device according to claim 8, wherein the radiating element include:

a plurality of first radiating elements arranged at predetermined intervals on one side of the power supply line; and a plurality of second radiating elements arranged at predetermined intervals on an other side of the power supply line and disposed between the plurality of first radiating elements.

* * * * *